(12) United States Patent
Nagahashi

(10) Patent No.: US 7,602,520 B2
(45) Date of Patent: Oct. 13, 2009

(54) PICTURE TRANSMISSION/RECEPTION SYSTEM, PICTURE RECEIVER APPARATUS AND PRINTER

(75) Inventor: Toshinori Nagahashi, Tatsuno (JP)

(73) Assignee: Seiko Epson Corporation (JP)

( * ) Notice: Subject to any disclaimer, the term of this patent is extended or adjusted under 35 U.S.C. 154(b) by 788 days.

(21) Appl. No.: 11/343,847

(22) Filed: Jan. 31, 2006

(65) Prior Publication Data

US 2006/0174305 A1 Aug. 3, 2006

(30) Foreign Application Priority Data

Feb. 1, 2005 (JP) ............................. 2005-024985

(51) Int. Cl.
*G06F 15/00* (2006.01)
*H04N 1/46* (2006.01)
*H04N 1/00* (2006.01)

(52) U.S. Cl. .................... 358/1.16; 358/523; 358/1.15; 358/405

(58) Field of Classification Search ................ 358/1.16, 358/500, 523, 400, 401, 444, 426.05, 451, 358/452, 1.15, 405; 348/14.13, 441, 568, 348/571, 721; 345/591, 600, 10, 204
See application file for complete search history.

(56) References Cited

U.S. PATENT DOCUMENTS

| 6,269,215 B1 * | 7/2001 | Okayama et al. ............. 386/31 |
| 2001/0004739 A1 * | 6/2001 | Sekiguchi et al. ........... 707/100 |
| 2006/0072395 A1 * | 4/2006 | Kobayashi .................. 369/47.1 |
| 2006/0095773 A1 * | 5/2006 | Itoh et al. ................... 713/176 |
| 2006/0159370 A1 * | 7/2006 | Tanaka et al. ............... 382/305 |

FOREIGN PATENT DOCUMENTS

JP 2002-232815 8/2002
JP 2004-102590 4/2004

* cited by examiner

*Primary Examiner*—Jerome Grant, II
(74) *Attorney, Agent, or Firm*—Harness, Dickey & Pierce, P.L.C.

(57) ABSTRACT

A picture transmission/reception system includes: an information supply apparatus that supplies, sequentially in time, combined information including picture information and counterpart-picture location information representative of a location of counterpart-picture information that is information about a picture related to the same subject-of-display but different in processability attribute from the picture information; and a picture receiver apparatus that has a receiving part that receives the combined information supplied by the information supply apparatus, a picture-display processor that displays, sequentially in time, picture information included in the combined information received at the receiving part, and a counterpart-picture-data acquirer that analyzes counterpart-picture location information corresponding to a picture selected by a user out of pictures displayed by the picture-display processor and accesses a location of the counterpart-picture in a data storage apparatus that stores the counterpart-picture represented by the counterpart-picture location information, to thereby acquire one of counterpart-picture data related to the one piece of picture information. The counterpart-picture-data acquirer of the picture receiver apparatus is configured to detect a processability attribute as to the acquired one of counterpart-picture data, and evaluate whether or not the detected processability attribute is suited for a predetermined use by the user and related to a highest or comparatively higher quality acquirable. When a result of evaluation is negative, a retrieval processing is made to retrieve for another one of counterpart-picture data having a processability attribute for a comparatively higher quality while, when the result of evaluation is affirmative, the picture data evaluated is outputted.

18 Claims, 7 Drawing Sheets

```
<PreLoadFile resolution=high>
  http://www.example.com/a_extended.jpg
</PreLoadFile>
```

FIG. 7

PICTURE TRANSMISSION/RECEPTION SYSTEM, PICTURE RECEIVER APPARATUS AND PRINTER

BACKGROUND

1. Technical Field

The present invention relates to a picture transmission/reception system that allows to acquire picture data representative of a picture related to the same subject-of-display as a subject-of-display (subject-of-representation) corresponding to a picture among time-series pictures (motion pictures or time-series still pictures), for example, to acquire by utilization of, for example, a televised broadcast, wired picture distribution service or the like as a supply source of picture information, and to a picture receiver apparatus and printer suited for the system.

2. Related Art

Recently, it is a usual practice to obtain a hard copy by using the picture data acquired through utilization of a televised broadcast, wired picture distribution service or the like and perform a printing of the picture data at a printer held by the user.

Generally, where receiving and printing the digital broadcast data distributed from a broadcast station by a plurality of picture receiver apparatuses, there are usually connected a variety of models of receivers and printers that are different in function (specification).

For this reason, the distribution contents are prepared uniform in picture-quality level by taking account of every model possibly applied at all times, and there is a difficulty in actualizing an effective function only for those models possessing excellent capabilities or particular models. Namely, some models are difficult in exhibiting their inherent functions, which is conspicuously unreasonable in respect of functions and economy.

In place of using, for printing, the picture data acquired by utilization of a televised broadcast, a wired picture distribution service or the like, there are now proposed such technologies that can acquire and print the picture data acquired from a server, etc. connected to a network, the data having a processability that attributes to higher quality than that of the picture data of the related art.

Such technical proposals include an example that a broadcast receiver acquires moving-picture data and a pointer, as information representative of a location of a picture related to the frames of the data, and, when there is a print request from a user, access a storage location as designated by the pointer related to a selected frame of the moving-picture data, to acquire the information stored in the storage location and print-output the same so that it broadcasts in a multiplex form from a broadcast station (e.g. JP-A-2002-232815 (paragraphs 0041-0059, FIGS. 5 and 7)).

However, the art proposed in JP-A-2002-232815 is a mere provision of convenience enabling to acquire a still picture excellent in processability attribute selected as a corresponding one to a scene (one frame) out of moving-picture broadcast. This is far from an automatic acquisition of the processability-attribute picture data that allows full exhibition of the capability as to the processability attribute for printing, in the case the user makes a printing by use of a printer as intended.

In other words, this could not cope with the foregoing problem that the model having a superior specification is not allowed to fully exhibit its function conspicuously unreasonably in respect of functions and economy, because, by taking account of every model possibly applied at the reception ends at all times, the content distribution end makes an adaptation uniformly to those having a comparatively inferior specification in function and processability attribute (attribute including a picture definition, for example) for quality.

SUMMARY

An advantage of some aspects of the invention is to provide a picture transmission/reception system that allows a reception-end apparatus having a superior specification to fully exhibit its function even in case a distribution content picture has an inferior processability attribute in its quality, and a picture receiver apparatus and printer suited for the system.

According to the invention, there is provided a system including a broadcast station and a plurality of reception-end apparatuses, which can automatically, separately acquire, from a server as data storage apparatus, and makes a printing of picture data having a processability attribute for the highest or comparatively higher quality suited for the specification of each sub-system on the reception end. As a result a reasonable system can be realized that allows the reception-end sub-system to fully exhibit its capability.

Here, definition is made on the terms that are used in the following description. Namely, the pictures included in print contents are classified into a "base attribute picture" which can be handled (processed for printing) on every printer possibly to be used, and an "extended attribute picture" which can be handled only some printers among all the printers (models).

Although the base attribute picture and the extended attribute picture have the common subject-of-display and provide nearly the same print results excepting in their resolutions, the both includes one or two or more differences among the following attributes. Namely, (a) resolution,
(b) compression type,
(c) file format,
(d) parameters as to printing, and so on.

Meanwhile, the term of "processability attribute" is relevant to the resolution, compression type, file format, parameters as to printing (e.g. those related to color reproduction) and so on. In the embodiment, one or a plurality of those are to define the processability attribute.

The present invention, concretely, proposes the following techniques.

(1) According to an aspect of the invention, a picture transmission/reception system comprises: an information supply apparatus that supplies, sequentially in time, combined information of picture information and counterpart-picture location information representative of a location of counterpart-picture information that is information about a picture related to the same subject-of-display but different in processability attribute from the picture information; and a picture receiver apparatus that has a receiving part that receives the combined information supplied by the information supply apparatus, a picture-display processor that displays, sequentially in time, picture information included in the combined information received at the receiving part, and a counterpart-picture-data acquirer that analyzes counterpart-picture location information corresponding to a picture selected by a user out of pictures displayed by the picture-display processor and accesses a location of the counterpart-picture in a data storage apparatus that stores the counterpart-picture represented by the counterpart-picture location information, to thereby acquire one of counterpart-picture data related to the one piece of picture information; wherein the counterpart-picture-data acquirer of the picture receiver apparatus is configured to detect a processability attribute as to the acquired one of counterpart-picture data, and evaluate whether or not the detected processability attribute is suited for a predetermined use by the user and related to a highest or comparatively higher quality acquirable so that, when the result of evaluation is negative, a retrieval processing is made to retrieve for another one of counterpart-picture data having a processability attribute for a comparatively higher quality while, when the result of evaluation is affirmative, the picture data evaluated is outputted.

Due to this, the picture receiver apparatus received, at the receiving part, combined information supplied sequentially in time from the information supply apparatus, such as a server or a broadcast station, connected to a network, causes the picture-display processor to display the picture information included in the received combined information, and the counter picture-data acquirer to access a location thereof depending upon the counterpart picture-location information included in the combined information, detects a processability attribute as to the acquired counterpart-picture, and evaluates whether the detected processability attribute is suited for a predetermined use (e.g. printing on a printer intended to apply) by the user and for a highest or comparatively high quality acquirable. When the result of evaluation is negative, a retrieval process is performed to retrieve for another one of counterpart picture data having a processability attribute for a comparatively higher quality. When the result of evaluation is affirmative, the picture data evaluated is outputted. Therefore, it is possible to automatically acquire counterpart picture data having a processability attribute suited for a user's predetermined use and related to a highest or comparatively higher quality acquirable.

(2) It is preferable that the picture supply apparatus is configured to supply the counterpart-picture location information as meta-data.

Due to this, it is possible to obtain required counterpart picture-location information from the meta-data of the combined information distributed from the information supply apparatus.

(3) It is preferable that there is further comprised of a printer that is supplied with picture data outputted from the picture receiver apparatus and performs a printing of the picture data, the picture receiver apparatus being configured to perform the evaluation by applying a value of processability attribute for a highest or comparatively higher quality for printing on a printer the use is to use, as a value of processability attribute for a highest or comparatively higher quality suited for a predetermined use by the user.

Due to this, the evaluation and counterpart picture-data acquisition processings are carried out so as to automatically acquire counterpart picture data relevant to a value of a processability attribute for the highest or comparatively higher quality of printing on a printer the user intends to use. The counterpart picture thus acquired can be served for printing.

(4) It is preferable that the printer is configured integrally with the picture receiver apparatus.

Due to this, realized is a system the printer and the picture receiver apparatus are configured in one body, that is easy to handle and sufficient in convenience.

(5) It is preferable that the picture receiver apparatus is configured such that a picture-display processor of its own can supply picture information, sequentially in time, to an external picture display and cause the picture display to display a picture.

Due to this, a system can be configured in which the picture receiver apparatus itself is a simple apparatus not having a picture display.

(6) It is preferable that the picture receiver apparatus has a picture display in a picture-display processor of its own.

Due to this, a system is realized which does not require a separate picture display and is easy to handle because the picture receiver apparatus itself has a picture display.

(7) According to a further aspect of the invention, a picture receiver apparatus comprises: a receiving part that receives, sequentially in time, combined information including picture information supplied sequentially in time and counterpart-picture location information representative of a location of counterpart-picture information that is information about a picture related to the same subject-of-display but different in processability attribute from the picture information; a picture-display processor that displays, sequentially in time, picture information included in the combined information received at the receiving part; and a counterpart-picture-data acquirer that analyzes counterpart-picture location information corresponding to a picture selected by a user out of pictures displayed by the picture-display processor and accesses a location of the counterpart-picture in a data storage apparatus that stores the counterpart-picture represented by the counterpart-picture location information, to thereby acquire one of counterpart-picture data related to the one piece of picture information; wherein the counterpart-picture-data acquirer is configured to detect a processability attribute as to the acquired one of counterpart-picture data, and evaluate whether or not the detected processability attribute is suited for a predetermined use by the user and related to a highest or comparatively higher quality acquirable so that, when a result of evaluation is negative, a retrieval processing is made to retrieve for another one of counterpart-picture data having a processability attribute for a comparatively higher quality while, when the result of evaluation is affirmative, the picture data evaluated is outputted.

Due to this, at the receiving part is received combined information supplied sequentially in time from the information supply apparatus, such as a server or a broadcast station, connected to a network. The picture-display processor is caused to display the picture information included in the received combined information, and the counter picture-data acquirer is caused to access a location thereof depending upon the counterpart picture-location information included in the combined information, thereby acquiring a counterpart picture different in processability attribute. Furthermore, a processability attribute is detected as to the acquired counterpart-picture, to evaluate whether or not the detected processability attribute is suited for a predetermined use (e.g. printing on a printer intended to apply) by the user and related to a highest or comparatively high quality acquirable. When the result of evaluation is negative, a retrieval process is performed to retrieve for another one of counterpart picture data having a processability attribute for a comparatively higher quality. When the result of evaluation is affirmative, the picture data evaluated is outputted. Therefore, it is possible to automatically acquire counterpart picture data suited for user's predetermined use and related to a processability attribute for a highest or comparatively higher quality acquirable.

(8) It is preferable that the counterpart-picture-data acquirer is configured to analyze counterpart-picture location information included in the meta-data related to the one picture and access a location of the counterpart-picture in a data storage apparatus that stores the counterpart-picture represented by the counterpart-picture location information, to thereby acquire one of counterpart-picture data related to the one piece of picture information.

Due to this, it is possible to obtain required counter picture-location information out of the meta-data of the combined information distributed from the information supply apparatus.

(9) It is preferable that a printer the user is to use is made connectable to perform a printing of the picture data by supplying picture data as its own output to the printer, to perform the evaluation by applying a value of processability attribute for a highest or comparatively higher quality for printing on the printer, as a value of processability attribute for a highest or comparatively higher quality suited for a predetermined use by the user.

Due to this, the evaluation and counterpart picture-data acquisition processings are carried out to automatically acquire counterpart picture data having a processability attribute in a value for a highest or comparatively higher quality for printing on a printer the user intends to apply. Thus, an acquired counterpart picture can be served for printing.

(10) It is preferable that there is further comprised of a printer for performing a printing of picture data as its own output.

Due to this, realized is a system in which the printer and the picture receiver apparatus are configured integrally, and which is easy to handle and sufficient in convenience.

(11) It is preferable that the picture-display processor is configured to supply, sequentially in time, picture information to an external picture display and cause the picture display to display a picture.

Due to this, it is possible to configure a system in which the picture receiver apparatus itself is a simple apparatus not having a picture display.

(12) It is preferable that a picture display is provided in the picture-display processor.

Due to this, it is possible to realize a system not requiring a separate picture display and easy to handle because the picture receiver apparatus itself has a picture display.

(13) It is preferable that the counterpart-picture-data acquirer is configured to analyze the counterpart-picture location information in timing the receiving part received, sequentially in time, the combined information and the user selected one piece of picture information out of the combined information received, and to access a location of the counterpart-picture in a data storage apparatus that stores the counterpart-picture represented by the counterpart-picture location information, to thereby acquire one of counterpart-picture data related to the one piece of picture information.

Due to this, when the user selected one piece of picture information out of the received combined information, relevant counterpart-picture location information is analyzed without delay, to access a location of the counterpart picture in a data storage apparatus that stores the counterpart represented by the counterpart picture-location information. Thus, it is possible to obtain one of counterpart picture data related to the one of picture information.

(14) It is preferable that there is comprised of a storage apparatus that stores counterpart-picture data acquired by the counterpart-picture-data acquirer.

Due to this, by storing the acquired counterpart picture data in the storage apparatus, the evaluation or output of the counterpart picture data can be made in proper timing after the storage.

(15) According to a still further aspect of the invention, a printer comprises: a receiving part that receives, sequentially in time, combined information including picture information supplied sequentially in time and counterpart-picture location information representative of a location of the counterpart-picture information that is information about a picture related to the same subject-of-display but different in processability attribute from the picture information; a picture-display processor that displays, sequentially in time, picture information included in the combined information received at the receiving part; a counterpart-picture-data acquirer that analyzes counterpart-picture location information corresponding to a picture selected by a user out of pictures displayed by a processing of the picture-display processor and accesses a location of the counterpart-picture in a data storage apparatus that stores the counterpart-picture represented by the counterpart-picture location information, to thereby acquire one of counterpart-picture data related to the one piece of picture information, and a print processor that makes a printing of counterpart-picture data acquired by the counterpart-picture-data acquirer; wherein the counterpart-picture-data acquirer is configured to detect a processability attribute as to the acquired one of counterpart-picture data, and evaluate whether or not the detected processability attribute is in a level to be handled by the print processor and related to a highest or comparatively higher quality acquirable so that, when a result of evaluation is negative, retrieval is made for another one of counterpart-picture data having a processability attribute for a comparatively higher quality while, when the result of evaluation is affirmative, the picture data evaluated is outputted to the print processor.

Due to this, at the receiving part is received combined information supplied sequentially in time from the information supply apparatus, such as a server or a broadcast station, connected to a network. The picture-display processor is caused to display the picture information included in the received combined information, and the counter picture-data acquirer is caused to access a location thereof depending upon the counterpart picture-location information contained in the combined information, thereby acquiring a counterpart picture different in processability attribute. Furthermore, a processability attribute is detected as to the acquired counterpart-picture, to evaluate whether or not the detected processability attribute is in a level to be handled by the print processor and is the highest or comparatively high quality available. When the result of evaluation is negative, a retrieval process is performed to retrieve for another one of counterpart picture data having a processability attribute for a comparatively higher quality. When the result of evaluation is affirmative, the picture data evaluated is outputted. Therefore, it is possible to make a printing of a counterpart picture relevant to a processability attribute for the highest or comparatively higher quality acquirable.

(16) It is preferable that the processability attribute is defined by one or a plurality of resolution, compression type, file format and printing parameters.

Due to this, automatically acquired is the counterpart picture data as defined by one or a plurality of resolution, compression type, file format and printing parameters as a processability attribute suited for a predetermined use by the user and for the highest or comparatively higher quality to be acquired.

(17) It is preferable that the processability attribute is defined by one or a plurality of resolution, compression type, file format and printing parameters.

Due to this, automatically acquired is the counterpart picture data as defined by one or a plurality of resolution, compression type, file format and printing parameters as a processability attribute suited for a predetermined use by the user and for the highest or comparatively higher quality to be acquired.

(18) It is preferable that the processability attribute is defined by one or a plurality of resolution, compression type, file format and printing parameters.

Due to this, automatically acquired is the counterpart picture data as defined by one or a plurality of resolution, compression type, file format and printing parameters as a processability attribute suited for a predetermined use by the user and for the highest or comparatively higher quality to be acquired.

BRIEF DESCRIPTION OF THE DRAWINGS

The invention will be described with reference to the accompanying drawings, wherein like numbers reference like elements.

FIG. 7 is a figure showing an example of meta-data related to a picture.

DESCRIPTION OF EXEMPLARY EMBODIMENTS

With reference to the drawings, embodiments of the present invention will be described. Note that the figures hereinafter referred will be shown with suitable exaggeration in their essential parts forming subjects of explanations while simplifying or omitting those excepting the essential parts.

Figure 1:
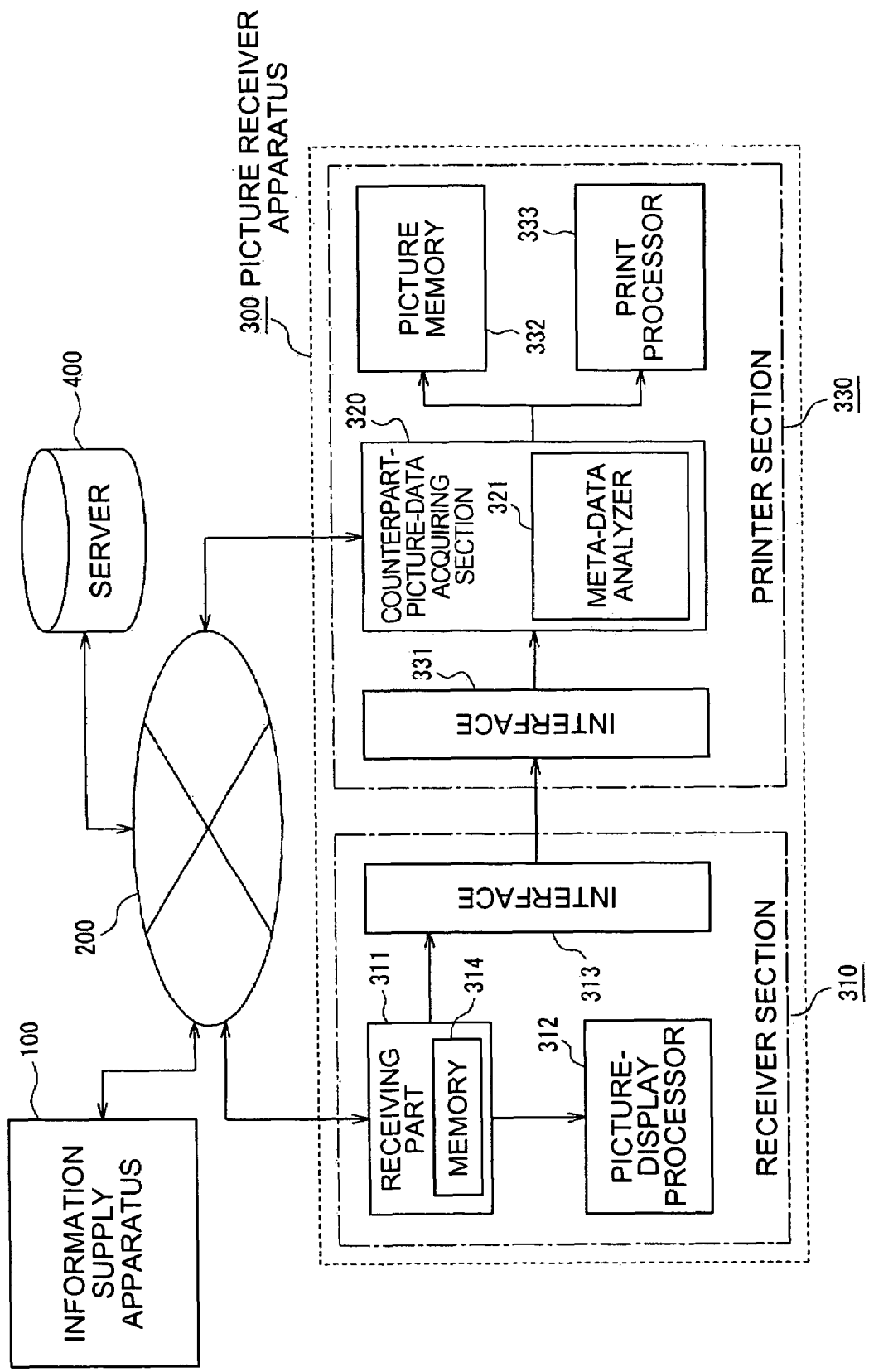
FIG. 1 is a block diagram showing a picture transmission/reception system in one embodiment of the present invention.

FIG. 1 is a block diagram showing a picture transmission/reception system in one embodiment of the invention. In FIG. 1, an information supply apparatus 100, set up at a broadcast station, etc., sequentially supplies combined information containing a series of pieces of picture information represented in time sequence to configure a moving picture and meta-data as counterpart-picture location information representing a location of the counterpart-picture information about a picture related to the same subject-of-display but different in processability attribute from the picture information.

The combined information is sequentially transmitted wirelessly on a broadcast radio wave or supplied to a picture receiver apparatus 300 via the Internet 200, or otherwise may be transmitted and supplied in a broadcast form using an IP like a video-on-demand broadcast. The picture receiver apparatus 300 has a receiving part 311 that receives the combined information supplied from the information supply apparatus 100, a picture-display processor 312 that sequentially displays the picture information contained in the combined information received at the receiving part 311, and a counterpart-picture data acquirer 320 that accesses a location of the counterpart-picture in a data storage apparatus (server) 400 storing counterpart-picture represented by counterpart-picture location information by means of a meta-data analyzer 321 that is to analyze counterpart-picture location information (information contained in meta-data, in this embodiment) corresponding to one picture selected by the user out of the pictures being displayed by the picture-display processor 312 and acquire one of counterpart-picture data related to the one piece of picture information.

The user's selection is to be made by a selective operation, etc. to an operation key in an known selecting operation (not shown) in an environment under which the user monitors a suitable display of reception picture, as realized, by a picture-display processing section 312 referred later, for example.

The picture-display processor 312 may be in a form that provides a suitable picture display arranged outside the picture receiver apparatus 300 with a signal suited for the picture display thereby making a picture display. In this case, the picture receiver apparatus 300 itself can be configured as a simple apparatus not having a picture display. Meanwhile, the picture-display processor 312 can take a form having a display to serve itself as a picture display. In this case, because the picture receiver itself possesses a picture display function, a system easy to handle is realized without requiring a separate picture display.

The counterpart-picture data acquirer 320, when accessing the data storage apparatus (server) 400 through the Internet 200, uses a transfer protocol, e.g. HTTP or FTP, and acquires a relevant file.

The meta-data analyzer 321 analyzes the meta-data sent related to a picture-file header or a picture. In the FIG. 1 embodiment, a receiver section 310 is configured including the receiving part 311, the picture-display processor 312 and, further, an interface 313 serving as a connection to supply the output of the receiving part to the later stage device. The receiving part 311 is additionally provided with a memory 314 serving also as a buffer that holds the picture data received and processed, as required, by decoding or so.

Meanwhile, a printer section 330 is configured including an interface 331 connected to the interface 313 of the receiver section 310, the counterpart-picture data acquirer 320, a picture memory 332 storing the output of the counterpart-picture data acquirer 320, and a print processor 333 that makes a printing of the output of the counterpart-picture data acquirer 320. The picture memory 332 stores a picture acquired by the receiver section 310 (at its receiving part 311) or the counterpart-picture data acquirer 320. The purpose of storing a picture in the printer section lies in the following two points.

(1) Storing extended attribute picture (counterpart-picture data). When receiving and printing a base attribute picture, the corresponding extended attribute picture is retrieved from the picture storage means (picture memory 332) of the printer section 330 and served for printing. Note that the terms "extended attribute picture" and "base attribute picture" are as per the definition in the introductory part of "Summary".

(2) In preparation for repeated printing, the picture data is stored that is highly possibly served for such printing. For example, because frames (i.e. background pictures, e.g. including frame-formed ornamental patterns to be desirably used by users) tend to be frequently used for printing, picture data of such frames is stored beforehand.

The print processor 333 makes a predetermined picture processing on a received print content, to print it on a printing paper by an inkjet scheme, a thermal transfer scheme or the like. The print content is usually structured by a plurality of texts or a plurality of pictures. For example, it is described based on XHTML as defined under W3C (World Wide Web Consortium). The XHTM standard is disclosed in http://www.w3.org/TR/xhtml-print/. Although texts or pictures may be contained in a print-content file, the print content may only describe URL of a text or picture so that it can be acquired from URL.

The counterpart-picture data acquirer 320, in the picture receiver apparatus 300, detects processability attribute (e.g. definition) as to an acquired one of counterpart-picture data depending uon the meta-data annexed to the picture, for example, and evaluates whether or not the detected processability attribute is suited for a user's predetermined use (e.g. print processing of a printer to be applied) and for the highest or comparatively higher quality to be acquired. When the result of evaluation is negative, a retrieval process is performed to retrieve for another one of counterpart-picture data of processability attribute for relatively high in quality. When the result of evaluation is affirmative, the relevant picture data evaluated is outputted.

Incidentally, between the interface 313 of the receiver section 310 and the interface 331 of the printer section 330, a connection can be provided with a signal transmission line conforming to Ethernet (registered trademark), IEEE1934, SCSI, USB (universal serial bus) or the like. As referred later, the interface 313 of the receiver section 310 and the interface 331 of the printer section 330, in the FIG. 1 embodiment, have a connection interposed between the receiving part 311 and the counterpart-data acquirer 320. However, it can take a form different from that. Also, in such a case, similar data transfer scheme can be applied.

Figure 2:
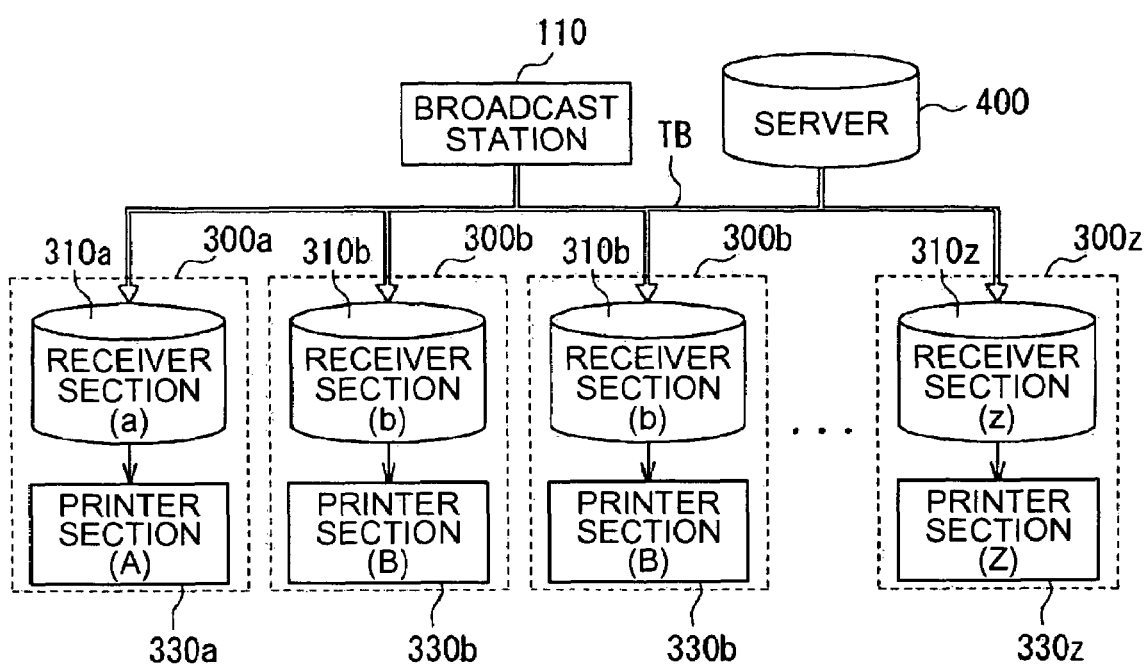
FIG. 2 is a concept figure showing a state that a plurality of picture receiver apparatuses are connected to a common transmission line supplying picture data from an information supply apparatus, in the embodiment of the invention.

FIG. 2 is a concept figure showing a state that a plurality of picture receiver apparatuses are connected to a common transmission line used in supplying picture data from the information supply apparatus, in the present embodiment of the invention. In FIG. 2, there are configured a plurality of picture receiver apparatuses 300a, 300b, 300b, . . . , 300z each of which is nearly the same with the picture receiver apparatus 300 in FIG. 1 and connected to the transmission line TB so that they can receive the digital broadcast data distributed, through wire via a transmission line TB, from the broadcast station 110 including an information supply apparatus similar to the explanation with reference to FIG. 1.

There is set up a server 400, as a data storage apparatus that stores picture data having a processablility attribute as to a comparatively high quality, so as to be accessible through the transmission line TB. The transmission line TB, as considered from the function noticed here, corresponds to the Internet 200 explained with reference to FIG. 1.

The picture receiver apparatus 300a is configured including a receiver section 310a and printer section 330a similar to the receiver section 310 and printer section 330 explained with reference to FIG. 1. Likewise, the picture receiver apparatus 300b is configured including a receiver section 310b and a printer section 330b while the picture receiver apparatus 300z is configured including a receiver section 310z and a printer section 330z.

The printer sections 330a, 330b, 330b, . . . , 330z of the respective picture receiver apparatuses 300a, 300b, 300b, . . . , 300z are different in the definition (in limit value thereof in specification), for example, as a processability attribute for printing. The definition level, in the illustrated example, is (A) at the printer section 330a, (B) at 330b and (Z) at 330z, wherein (A) is the highest among those, (B) is the next highest to (A), and (Z) is in the lowest.

With the FIG. 2 system example, explanation is made on the difference between a base attribute picture and an extended attribute picture, in respect of resolution. For any of the printer sections 330a, 330b, 330b, . . . , 330z of the respective picture receiver apparatuses 300a, 300b, . . . , 300×(e.g. printer section 330z), when a higher-resolution picture cannot be processed, a lower-resolution picture is served as a base attribute picture for printing on the relevant apparatus.

Meanwhile, the printer capable of processing a higher-resolution picture (e.g. printer section 330a, 330b) is allowed to acquire a higher-resolution attribute picture and apply it for printing, thus obtaining a higher-resolution print effect.

Noticing the point of compression type, explanation is made on the difference between a base attribute picture and an extended attribute picture. Where there is included a printer not to able to handle highly-compressed picture data in candidate printers to apply (printer sections 330a, 330b, 330b, . . . , 330z), a picture having a low compression ratio is used as a base attribute picture. The printer, capable of processing a highly-compressed picture, is allowed to acquire an extended attribute picture serve it for printing and handle it as a subject of storage (saving).

Noticing the point of file format, it means literally a difference in file form or content.

Noticing the point of printing parameters, it is the information for enabling the optimal printing for each picture, e.g. discrimination of human shots and scenic photos. By separating the both, printing can be carried out with enhanced skin color for a human shot or in blue approximated to a color of memory for a scenic photo.

Figure 3A:
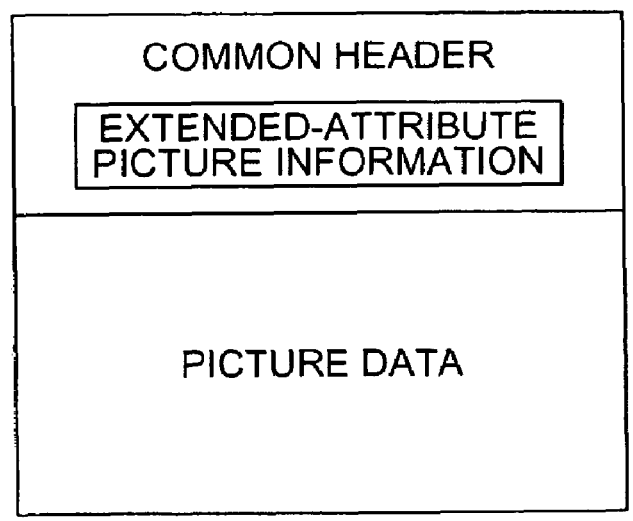
FIG. 3 is a concept figure showing a relationship between picture data and meta data.
Figure 3B:
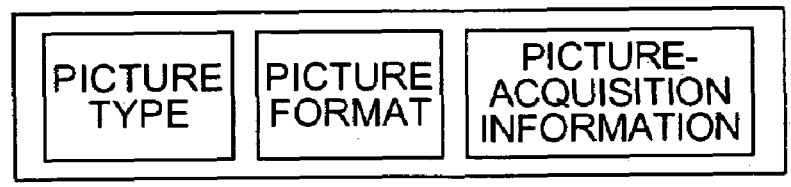
Figure 4:
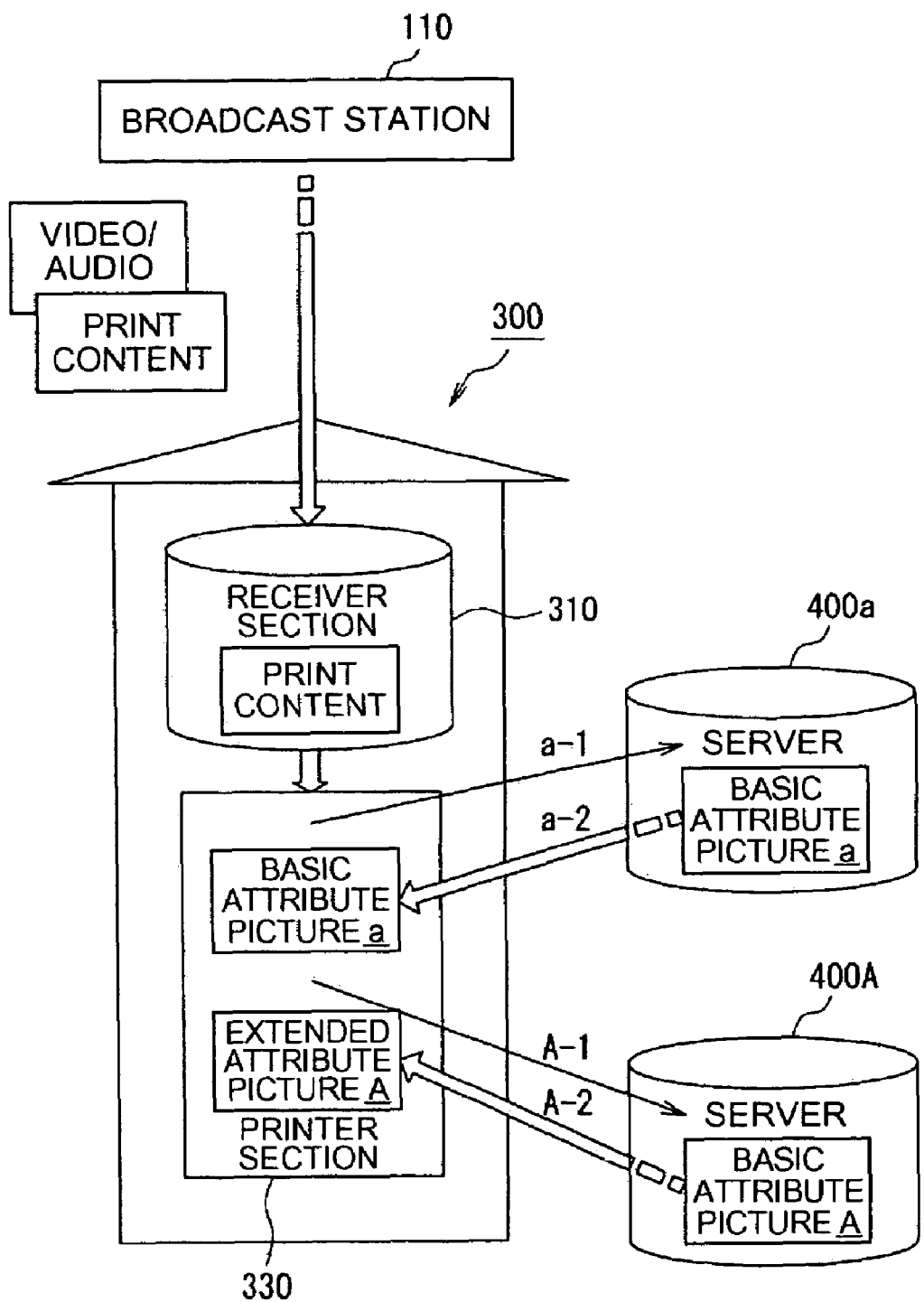
FIG. 4 is a concept figure concerning the operation of the picture receiver apparatus in the system explained with reference to FIG. 1.
Figure 5:
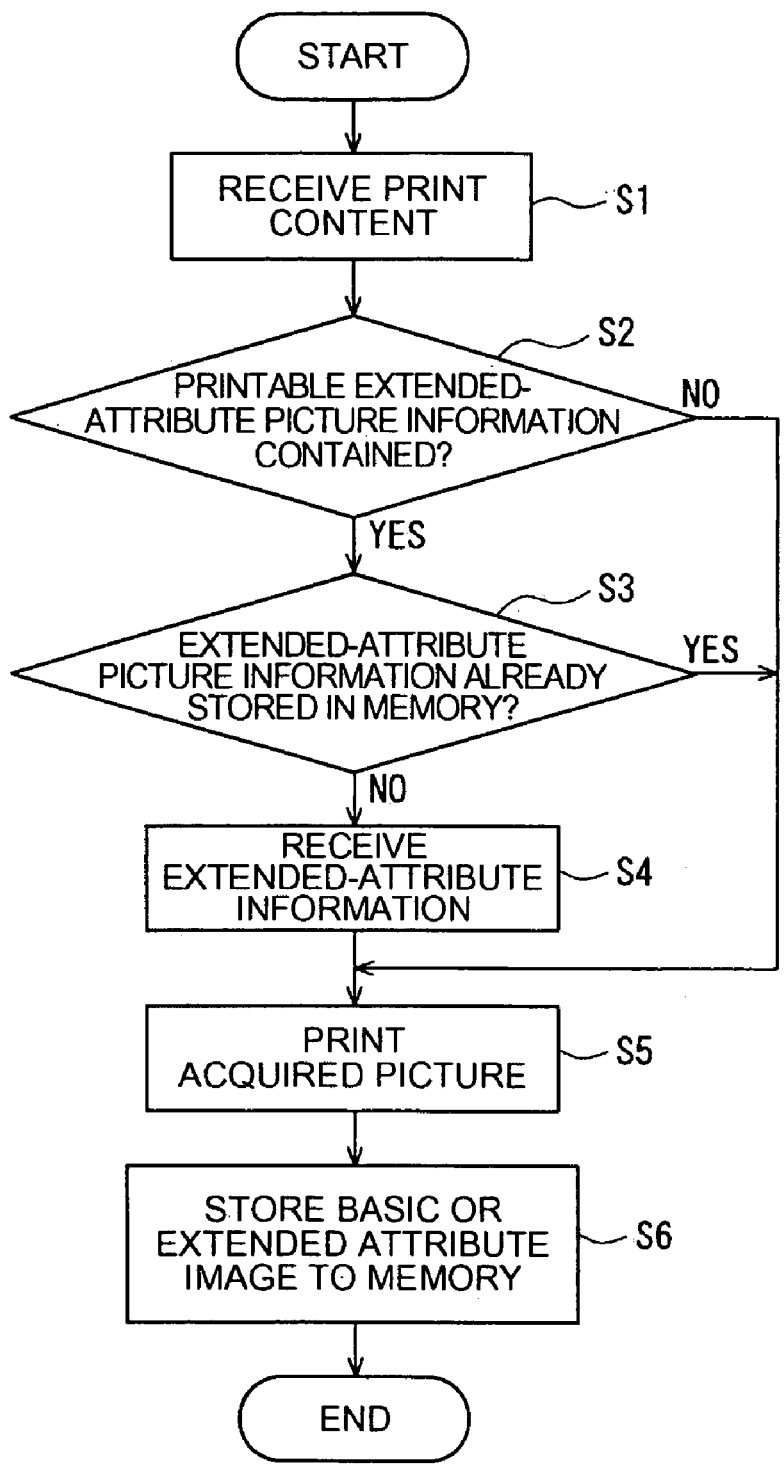
FIG. 5 is a flowchart explaining the operation of the picture receiver apparatus in the FIG. 1 system.

Referring to FIGS. 3 to 5 together, the operation of the embodiment of the invention is described in greater detail. FIGS. 3A and 3B are concept figures showing a relationship between picture data and meta-data, wherein FIG. 3A shows an example of a picture-data structure including a header area and a picture data area while FIG. 3B shows an example of a meta-data structure. FIG. 4 is a concept figure concerning the operation of the picture receiver apparatus 300 of the system explained with reference to FIG. 1. FIG. 5 is a flowchart explaining the operation of the picture receiver apparatus of the FIG. 1 system.

As shown in FIG. 3A, the picture data, as an example, has a data structure having a common header provided at a front of a picture data area representative of a picture itself. In the common header area, there is included meta-data having, in its part, extended attribute picture information (information, etc, representative of a location of the relevant picture). As Shown in FIG. 3B, the meta-data includes the information related to picture type, picture format and picture acquisition, for example.

"Picture Type" represents whether the main picture is of a base attribute or an extended attribute. In the case the main picture is of a base attribute, indication is made whether or not an extended attribute picture exists. "Picture Format" is used to show the information about an extended attribute picture when the main picture is of a base attribute. It describes a resolution, compression type and file format of an extended attribute picture, and parameters concerning picture processing. Where the printer (section) to be applied is capable of processing an extended attribute picture, it acquires an extended attribute picture and makes a print and storage processing.

"Picture Acquisition Information" describes the information for acquiring an extended attribute picture. For example, (1) when accessing method to the extended attribute picture is fixed (to a known Web server), it is satisfactory to describe a file name (file number) or (2) URL.

The above explanation is on the example that meta-data is included in a picture data header. Besides such a form, meta-data can be collectively stored in a separate file from the picture data, together with the information representative of a correspondence to the relevant picture data.

In FIG. 4, the elements corresponding to those of FIG. 1 are denoted with the same references. From the video and audio information sent sequentially in time through wire or on a broadcast radio wave out of the broadcast station 110, the receiver section 310 of the picture receiver apparatus 300 receives the information representative of a location of a print content contained in the information. Accordingly, access is made to a relevant storage of the server 400a whose location is represented (arrow a-1 in FIG. 4), to receive the print content (arrow a-2 in FIG. 4: FIG. 5, S1).

Then, the printer section 330 (at its meta-data analyzer: see FIG. 1) of the picture receiver apparatus 300 analyzes the meta-data of picture data structuring the print content. This reveals that it is a base attribute picture and there is the corresponding extended attribute picture. Furthermore, it is determined whether or not the extended attribute picture can be handled at the printer section 330 (at its print processor 333: see FIG. 1) to be applied for printing (FIG. 5, S2).

When the determination at step S2 is affirmative (to be able to be handled), it is determined whether or not the relevant extended attribute picture has already been acquired and stored (in the picture memory 332: see FIG. 1) (FIG. 5, S3).

When the determination at the step S3 is negative (when the relevant extended attribute picture has not yet been acquired), access is made to a relevant storage of the server 400A (arrow A-1 in FIG. 4) where the extended attribute picture data is stored, according to a metadata analysis result, to receive the data of the extended attribute picture (arrow A-2 in FIG. 4: FIG. 5, S4).

Then, printing is made for the extended attribute picture data acquired at the step S4.

When the determination is negative (when there is no extended attribute picture corresponding to the base attribute picture, or handling is impossible on the printer section despite existing) at the step S2, printing is made for the initial base attribute picture data (FIG. 5, S5).

When the determination is affirmative at the step S3 (when a relevant extended attribute picture has already been acquired and stored), it is not carried out to acquire an extended attribute picture duplicatedly. Hence, the extended attribute picture data already acquired is served for printing (FIG. 5, S5).

The base attribute picture data or extended attribute picture data served for printing is stored in the memory (picture memory 332: see FIG. 1) (FIG. 5, S6). There is no problem even if the step S6 process and the step S5 process are replaced in order with each other.

Note that, in the embodiment, URL is used to indicate a location of a picture, however, a CRID (content reference identifier) may be used as defined under non-patent document, ETSI TS 102 822-3-1 V1.1.1.

Figure 6:
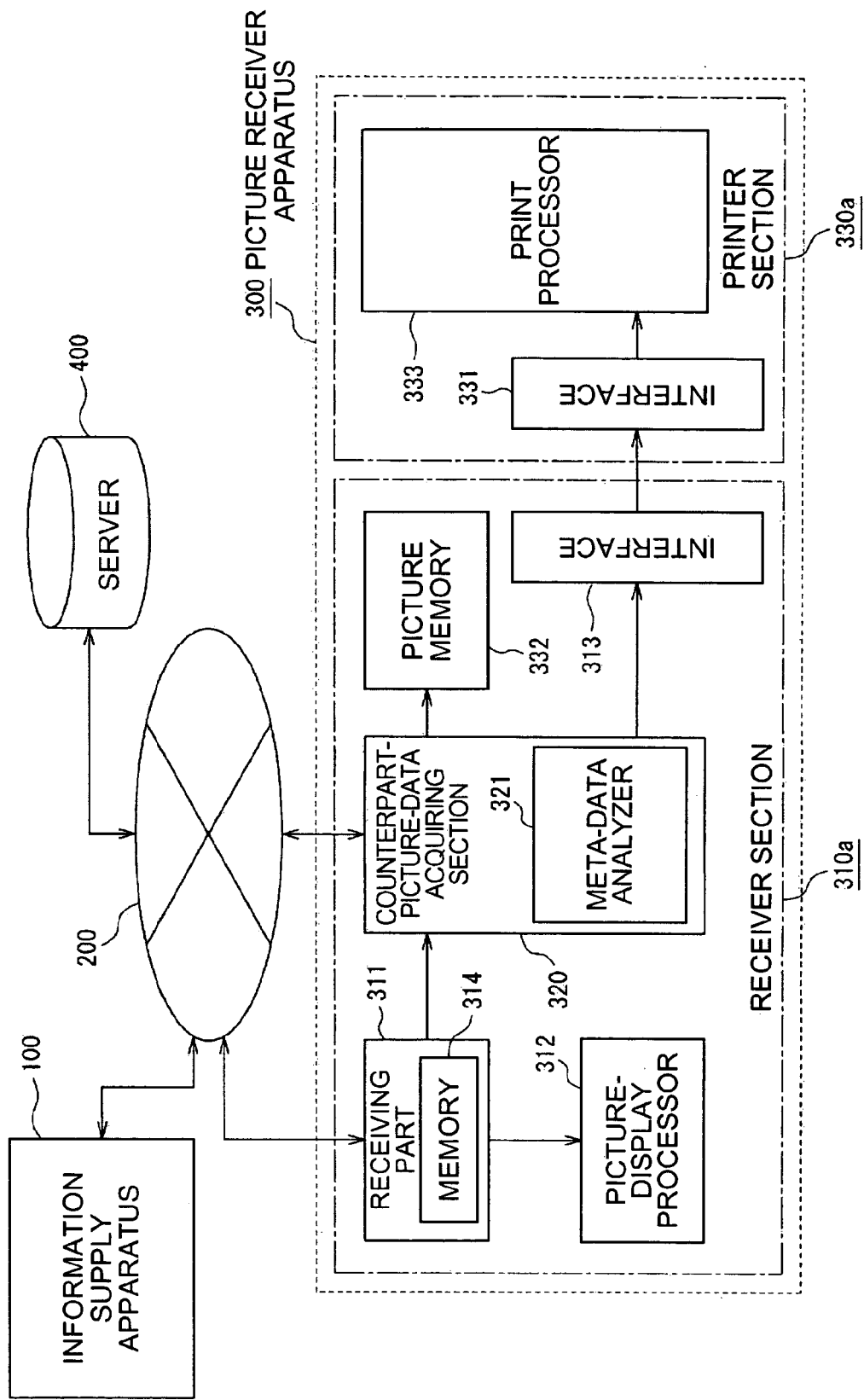
FIG. 6 is a block diagram showing another embodiment of the invention.

FIG. 6 is a block diagram showing another embodiment of the invention. In FIG. 6, the elements, corresponding to those of FIG. 1 already described, are denoted with the same references, to omit the detailed descriptions thereof. In the FIG. 6 embodiment, the information supply apparatus 100 wirelessly transmits combined information, already described, by a broadcast radio wave or supplies the same sequentially in time via the Internet 200, to the picture receiver apparatus 300. Similar to the case of FIG. 1 the supply may be by an IP-used broadcast such as video-on-demand broadcast.

The FIG. 6 system is different from that of FIG. 1, in respect of the configuration of the picture receiver apparatus 300. Namely, the picture receiver apparatus 300 has, at its receiver section 310a side, a receiving part 311 having a memory 314, a picture-display processor 312, a counterpart-picture data acquirer 320 including a meta-data analyzer 321, a picture memory 332 and an interface 313. Those elements have functions nearly similar to those of FIG. 1 already shown by using the same references.

Correspondingly to the receiver section 310a side, a printer section 330a side is configured with an interface 331 and a print processor 333. Namely, the foregoing counterpart-picture data (extended attribute picture data counterpart to the base attribute picture data), to be provided by the printer section 330 in the FIG. 1 embodiment, is acquired exclusively by the receiver section 310a side (at its counterpart-picture acquirer 320 including the meta-data analyzer 320) in the FIG. 6 embodiment. The printer section 330 side, connected to the receiver section 310a side through the interfaces 313, 331, is configured similarly to the usual known printer.

In the embodiments described so far, three patterns can be considered concerning the timing of acquiring the information about a location of an extended attribute picture at the picture receiver apparatus (having a printer section), i.e. (a) upon receiving a print content, (b) when instructed by a broadcast or (c) regular acquisition by the printer (picture receiver apparatus).

As for (a), the information is contained in the print content or acquired from the information contained in the received print content. This is as per the explanation made in the foregoing embodiment.

Concerning (b), the scheme is to make an instruction by a data broadcast prior to a need. In the case such picture metadata as exemplified in FIG. 7 is received, the printer (picture receiving apparatus) may acquire and store an extended attribute picture depending upon a URL. This, however, is limited to the case that the printer (print processor) applied, in its capability (specification), can handle the relevant extended attribute picture. For example, handling is not available where the picture file is extremely high in resolution surpassing the limit of specification or where the restoration processing to the original picture cannot be executed because of its high level of compression processing done.

Concerning (c), acquisition is made by an autonomous access of the printer (picture receiver apparatus) to a predetermined server over a network. It is satisfactory that the information supply end, e.g. broadcast station, previously release the date-and-hour information of the broadcast of a print-content wherein, prior to the broadcast, its extended attribute information is stored in a predetermined location of the server, to allow the printer (picture receiver apparatus) to access and acquire the same at a regular time interval.

The picture receiver apparatuses 300, of the systems described so far with reference to FIGS. 1 and 6, can be each configured as a printer having a print processor 333 unless considering the separation of the receiver and printer sections.

Namely, the picture receiver apparatuses 300, described with reference to those figures, are each configured with a receiving part 311 that receives, sequentially in time, combined information containing picture information supplied sequentially in time from the information supply apparatus and counterpart-picture location information representative of a location of counterpart-picture information related to the same subject-of-display as the relevant picture information, a picture-display processor 312 that displays sequentially in time the picture information contained in the combined information received at the receiving part 311, a counterpart-picture-data acquirer 320 that analyzes the counterpart-picture location information corresponding to a picture selected by the user from among the pictures displayed depending upon the processing at the picture-display processor 312 and accesses a location of counterpart-picture in a data storage apparatus (server 400) storing the counterpart-picture represented by the counterpart-picture location information to thereby acquire the counterpart-picture data related to the picture information, and a print processor 333 that makes a printing of the counterpart-picture data acquired by the counterpart-picture-data acquirer 320.

The counterpart-picture-data acquirer 320 is configured to detect a definition, as a processability attribute, as to the acquired one of counterpart-picture data relying upon metadata, etc. as noted before, evaluate whether or not the detected definition is in a level to be handled by the print processor 333 and the definition is at the highest limit available or comparatively high, wherein, when the result of evaluation is negative, retrieval is made for another one of counterpart-picture data comparatively higher in definition while, when the result of evaluation is affirmative, the print data thus evaluated is supplied to the print processor 333.

As described so far, the invention realizes a picture transmission/reception system that, even where the content picture to be distributed has an inferior processability attribute in quality for enabling the handling at the majority of reception-end apparatuses, the reception-end apparatus having particularly a superior specification is allowed to fully exhibit its function, and a picture receiver apparatus and printer adapted for the system.

The entire disclosure of Japanese Patent Application No. 2005-024985, filed Feb. 1, 2005 is expressly incorporated by reference herein.

What is claimed is:

1. A picture transmission/reception system comprising:
    an information supply apparatus that supplies, sequentially in time, combined information including picture information and counterpart-picture location information representative of a location of counterpart-picture information that is the information about a picture related to the same subject-of-display but different in processability attribute from the picture information; and
    a picture receiver apparatus that has
        a receiving part that receives the combined information supplied by the information supply apparatus,
        a picture-display processor that displays, sequentially in time, picture information included in the combined information received at the receiving part, and
        a counterpart-picture-data acquirer that analyzes counterpart-picture location information corresponding to a picture selected by a user out of pictures displayed by the picture-display processor and accesses a location of the counterpart-picture in a data storage apparatus that stores the counterpart-picture represented by the counterpart-picture location information, to thereby acquire one of counterpart-picture data related to the one piece of picture information;
    wherein the counterpart-picture-data acquirer of the picture receiver apparatus is configured to detect a processability attribute as to the acquired one of counterpart-picture data, and evaluate whether or not the detected processability attribute is suited for a predetermined use by the user and related to a highest or comparatively higher quality acquirable so that, when a result of evaluation is negative, a retrieval processing is made to retrieve for another one of counterpart-picture data having a processability attribute for a comparatively higher quality while, when the result of evaluation is affirmative, the picture data evaluated is outputted.

2. The picture transmission/reception system of claim 1, wherein the picture supply apparatus is configured to supply the counterpart-picture location information as meta-data.

3. The picture transmission/reception system of claim 1, further comprising a printer that is supplied with picture data outputted from the picture receiver apparatus and performs a printing of the picture data, the picture receiver apparatus being configured to perform the evaluation by applying a value of processability attribute for a highest or comparatively higher quality for printing on a printer that the use is to use, as a value of processability attribute for a highest or comparatively higher quality suited for a predetermined use by the user.

4. The picture transmission/reception system of claim 3, wherein the printer is configured integrally with the picture receiver apparatus.

5. The picture transmission/reception system of claim 1, wherein the picture receiver apparatus is configured such that a picture-display processor of its own can supply picture information, sequentially in time, to an external picture display and cause the picture display to display a picture.

6. The picture transmission/reception system of claim 1, wherein the picture receiver apparatus has a picture display in a picture-display processor of its own.

7. The picture transmission/reception system of claim 1, wherein the processability attribute is defined by one or a plurality of resolution, compression type, file format and printing parameters.

8. A picture receiver apparatus comprising:
    a receiving part that receives, sequentially in time, combined information including picture information supplied sequentially in time and counterpart-picture location information representative of a location of counterpart-picture information that is information about a picture related to the same subject-of-display but different in processability attribute from the picture information;
    a picture-display processor that displays, sequentially in time, picture information included in the combined information received at the receiving part; and
    a counterpart-picture-data acquirer that analyzes counterpart-picture location information corresponding to a picture selected by a user out of pictures displayed by the picture-display processor and accesses a location of the counterpart-picture in a data storage apparatus that stores the counterpart-picture represented by the counterpart-picture location information, to thereby acquire one of counterpart-picture data related to the one piece of picture information;
    wherein the counterpart-picture-data acquirer is configured to detect a processability attribute as to the acquired one of counterpart-picture data, and evaluate whether or not the detected processability attribute is suited for a predetermined use by the user and related to a highest or comparatively higher quality acquirable so that, when a result of evaluation is negative, a retrieval processing is made to retrieve for another one of counterpart-picture data having a processability attribute for a comparatively higher quality while, when the result of evaluation is affirmative, the picture data evaluated is outputted.

9. The picture receiver apparatus of claim 8, wherein the counterpart-picture-data acquirer is configured to analyze counterpart-picture location information included in the meta-data related to the one picture and access a location of the counterpart-picture in a data storage apparatus that stores the counterpart-picture represented by the counterpart-picture location information, to thereby acquire one of counterpart-picture data related to the one piece of picture information.

10. The picture receiver apparatus of claim 8, wherein a printer that the user is to use is made connectable to perform a printing of the picture data by supplying picture data as its own output to the printer, to perform the evaluation by applying a value of processability attribute for a highest or comparatively higher quality for printing on the printer, as a value of processability attribute for a highest or comparatively higher quality suited for a predetermined use by the user.

11. The picture receiver apparatus of claim 8, further comprising a printer for performing a printing of picture data as its own output.

12. The picture receiver apparatus of claim 8, wherein the picture-display processor is configured to supply, sequentially in time, picture information to an external picture display and cause the picture display to display a picture.

13. The picture receiver apparatus of claim 8, wherein a picture display is provided in the picture-display processor.

14. The picture receiver apparatus of claim 8, wherein the counterpart-picture-data acquirer is configured to analyze the counterpart-picture location information in the timing at which the receiving part received, sequentially in time, the combined information and the user selected one piece of picture information out of the combined information received, and to access a location of the counterpart-picture in a data storage apparatus that stores the counterpart-picture represented by the counterpart-picture location information, to thereby acquire one of counterpart-picture data related to the one piece of picture information.

15. The picture receiver apparatus of claim 8, comprising a storage apparatus that stores counterpart-picture data acquired by the counterpart-picture-data acquirer.

16. The picture receiver apparatus of claim 8, wherein the processability attribute is defined by one or a plurality of resolution, compression type, file format and printing parameters.

17. A printer comprising:
  a receiving part that receives, sequentially in time, combined information including picture information supplied sequentially in time and counterpart-picture location information representative of a location of the counterpart-picture information that is information about a picture related to the same subject-of-display but different in processability attribute from the picture information;

a picture-display processor that displays, sequentially in time, picture information included in the combined information received at the receiving part;

a counterpart-picture-data acquirer that analyzes counterpart-picture location information corresponding to a picture selected by a user out of pictures displayed by a processing of the picture-display processor and accesses a location of the counterpart-picture in a data storage apparatus that stores the counterpart-picture represented by the counterpart-picture location information, to thereby acquire one of counterpart-picture data related to the one piece of picture information, and a print processor that makes a printing of counterpart-picture data acquired by the counterpart-picture-data acquirer;

wherein the counterpart-picture-data acquirer is configured to detect a processability attribute as to the acquired one of counterpart-picture data, and evaluate whether or not the detected processability attribute is in a level to be handled by the print processor and related to a highest or comparatively higher quality acquirable so that, when a result of evaluation is negative, retrieval is made for another one of counterpart-picture data having a processability attribute for a comparatively higher quality while, when the result of evaluation is affirmative, the picture data evaluated is outputted to the print processor.

18. The printer of claim 17, wherein the processability attribute is defined by one or a plurality of resolution, compression type, file format and printing parameters.

* * * * *